United States Patent [19]

Suzuki et al.

[11] Patent Number: 5,667,561
[45] Date of Patent: Sep. 16, 1997

[54] METHOD FOR SELECTIVE SEPARATION OF CARBON DIOXIDE FROM WASTE GAS OF COMBUSTION

[75] Inventors: Kenzi Suzuki, Aichi-ken; Keiichi Inukai, Nagoya, both of Japan

[73] Assignee: Agency of Industrial Science & Technology, Ministry of International Trade & Industry, Tokyo, Japan

[21] Appl. No.: 586,275

[22] Filed: Jan. 16, 1996

[30] Foreign Application Priority Data

Jan. 26, 1995 [JP] Japan .................................. 7-030106
Mar. 3, 1995 [JP] Japan .................................. 7-070867

[51] Int. Cl.$^6$ .................................................. B01D 53/04
[52] U.S. Cl. ............................. 95/139; 95/130; 95/900; 423/230
[58] Field of Search ............................. 95/130, 139, 900, 95/902; 423/230, 232, 239.1

[56] References Cited

U.S. PATENT DOCUMENTS

| | | | |
|---|---|---|---|
| 1,716,028 | 6/1929 | Canon | 423/230 |
| 1,831,731 | 11/1931 | Al | 423/230 |
| 2,818,323 | 12/1957 | Haensel | 95/139 X |
| 2,845,382 | 7/1958 | Leum et al. | 423/230 X |
| 3,594,986 | 7/1971 | Schmid | 95/139 |
| 3,619,130 | 11/1971 | Ventriglio et al. | 95/139 X |
| 3,865,924 | 2/1975 | Gidaspow et al. | 95/139 X |
| 5,520,894 | 5/1996 | Heesink et al. | 95/139 X |

FOREIGN PATENT DOCUMENTS

| | | | |
|---|---|---|---|
| 0582189 | 8/1959 | Canada | 423/230 |
| 0 248 607 A1 | 12/1987 | European Pat. Off. | |
| 0 652 047 A1 | 5/1995 | European Pat. Off. | |
| 57-27902 | 2/1982 | Japan | |
| 63-147805 | 6/1988 | Japan | |
| 1-180218 | 7/1989 | Japan | |
| 0793616 | 1/1981 | U.S.S.R. | 95/139 |
| 1681922 | 10/1991 | U.S.S.R. | 423/230 |
| 0365111 | 7/1930 | United Kingdom | 423/230 |
| 879228 | 10/1961 | United Kingdom | |

OTHER PUBLICATIONS

NTS K. K., p. 22, 1991, Toshinaga Kawai, "Techniques for Recovery of Carbon Dioxide Gas".

Ohm K. K., pp. 114–115, 1993, Yuji Shindo, "Atmosphere Enveloping the Earth".

*Primary Examiner*—Robert Spitzer
*Attorney, Agent, or Firm*—Oblon, Spivak, McClelland, Maier & Neustadt, P.C.

[57] ABSTRACT

Selective separation and recovery of gaseous components of hot waste gas of combustion containing carbon dioxide is attained by causing the hot waste gas to contact an adsorbent containing as a substantial main component thereof an inorganic solid substance exhibiting surface basicity and inducing adsorption of the gaseous components of the hot waste gas on the adsorbent and then selectively separating the adsorbed gaseous components by virtue of differences in retention time among the gaseous components on the adsorbent.

2 Claims, 5 Drawing Sheets

METHOD FOR SELECTIVE SEPARATION OF CARBON DIOXIDE FROM WASTE GAS OF COMBUSTION

BACKGROUND OF THE INVENTION

1. Field of the Invention

This invention relates to a method for the separation and recovery from a hot waste gas of combustion such gaseous components as carbon dioxide in the original hot state without cooling the hot waste gas. The carbon dioxide and other gaseous components thus separated and recovered in the hot state can be utilized for chemical conversion reactions without loss of thermal energy. As a result, the specific gaseous components can be converted with high efficiency into various useful organic substances and such gaseous components as, for example, carbon dioxide which are entrained by the waste gas can be reclaimed at a low cost.

The total amount of energy consumed on the earth is huge and the consumption of this energy entails various environmental problems. One of the most serious of these is global warming and carbon dioxide is the main cause. If the consumption of fossil fuels continues to grow at the present rate, it is estimated that the carbon dioxide discharged by the burning of fossil fuels will by itself raise the average atmospheric temperature of the earth by 1° to 5° C. over the next 30 to 60 years.

For the solution of this problem, it is important to regulate the amount of discharged carbon dioxide. The occurrence of carbon dioxide cannot be eliminated so long as fossil fuels are used as energy sources. It is, therefore, important to separate and recover the carbon dioxide arising from the burning of fossil fuels and utilize it as a useful resources. Conceivable ways of making use of carbon dioxide include reduction to carbon monoxide and conversion into methanol, acetic acid, ethylene glycol, etc.

2. Description of the Prior Art

Known ways of separating and recovering carbon dioxide from mixed gases include the method of gas absorption, the method of low temperature separation (the method of distillation), the method of gas adsorption (the method of pressure swing adsorption and the method of temperature swing adsorption), the method of membrane separation, and the like ("Techniques for Recovery of Carbon Dioxide Gas," p. 22, compiled by Toshinaga Kawai and published by NTS K. K., 1991, and "Atmosphere Enveloping the Earth," p. 115, compiled by Yuji Shindo and published by Ohm K. K., 1993). The method of gas absorption separates carbon dioxide from a mixed gas by contacting the mixed gas at a low temperature with a liquid absorbent capable of selectively absorbing carbon dioxide, thereby effecting selective absorption of the carbon dioxide by the liquid absorbent, and then heating the resultant solution, thereby gasifying the carbon dioxide out of the solution. The method of low temperature separation (the method of distillation) effects the separation of carbon dioxide from a mixed gas by a procedure which comprises compressing and cooling the mixed gas until liquefaction and then subjecting the liquid mixture consequently obtained to fractional distillation. In the method of gas adsorption, the method of pressure swing adsorption (the PSA method) effects the separation of carbon dioxide from a mixed gas by a procedure which comprises pressing the mixed gas into contact with an adsorbent as, for example, activated carbon or a molecular sieve with micropores, thereby inducing selective adsorption of carbon dioxide, and then reducing the pressure, thereby separating the adsorbed carbon dioxide. This method is implemented, for example, by continuously performing the operations of pressure increase, adsorption, washing, and deaeration in a column. It is highly expensive, however, on account of the cost of the energy needed for increasing the pressure, of the equipment for adsorption and of the adsorbent used for the adsorption.

The method of temperature swing adsorption (the TSA method) attains the separation of carbon dioxide from a mixed gas by a procedure which comprises causing the mixed gas to contact the same adsorbent as mentioned above at normal room temperature or at a lowered temperature, thereby inducing selective adsorption of carbon dioxide, and then elevating the temperature, thereby separating the adsorbed carbon dioxide. This method, however, is disadvantageous in the points that it incurs a large energy cost at the step of regeneration of the adsorbent owing to the use of steam for this regeneration, entails the time-consuming operation of switching between high temperature and normal room temperature, and requires provision of a large heating device.

The method of membrane separation attains the separation of carbon dioxide from a mixed gas by setting in place in the flow path of the mixed gas a membrane capable of selectively passing carbon dioxide, differentiating the pressure before and after the membrane, and passing the mixed gas through this membrane.

The standard PSA method and TSA method mentioned above are techniques of highly extensive utility for the separation and recovery of specific gaseous components from various kinds of mixed gas. They cannot be easily utilized for the recovery of specific gaseous components from low-grade waste gas of combustion, however, owing to high cost.

The methods heretofore developed for the recovery of specific gaseous components from the waste gas will now be summarized.

A method for recovering valuable components from the waste gas exhausted from a furnace type carbon black production apparatus comprises removing carbon black powders from the waste gas, cooling and exposing to increased pressure the resultant waste gas, then recovering carbon dioxide and carbon monoxide from said gas by absorption with respectively suitable solvents (absorbents), and separating and recovering the hydrogen gas still remaining in the gas by the method of adsorption or the method of low temperature separation (JP-A-57-27,902). This method recovers carbon dioxide and carbon monoxide from the waste gas by absorption with respective liquid absorbents and, particularly for the purpose of the absorption of carbon dioxide, utilizes the popular technique of removing carbon dioxide by the circulation of an alkali solution using an aqueous solution of ethanol amine or an aqueous solution of potassium carbonate as the absorbent.

A method has been proposed for the recovery of carbon dioxide, argon, and nitrogen from combustion waste gas discharged from a low air ratio burner and containing substantially no oxygen by selectively separating carbon dioxide by adsorption at the first pressure swing adsorption step, selectively separating nitrogen or argon by adsorption at the second pressure swing adsorption step, and recovering the remainder of argon or nitrogen (JP-A-63-147,805). This method, however, is characterized by attaining selective adsorptive separation and recovery of carbon dioxide in accordance with the pressure swing adsorption method at an extremely low temperature by means of a carbon molecular sieve, synthetic zeolite, activated alumina, or silica gel as the adsorbent.

Further, for the recovery of specific gaseous components from a mixed gas, a method has been proposed for recovering a specific component such as, for example, carbon dioxide from a combustion waste gas using the method of pressure variation type adsorptive separation (the method of pressure swing adsorption, i.e. the PSA method) (JP-A-01-180,218). This method, however, is characterized by supplying the mixed gas in a form having the specific gaseous component contained therein under increased partial pressures, causing the specific gaseous component to be adsorbed on a clinobutyrolite type adsorbent, separating the adsorbed gaseous component from the adsorbent under a reduced pressure to recover the gaseous component, and performing the foregoing steps cyclically.

Though various methods have been proposed for the separation and recovery of specific gaseous components from waste gas as described above, they invariably carry out the operation of separation after the hot waste gas has been cooled. None of the heretofore known methods performs the operation of separation on a waste gas kept in the initial hot state. Therefore, the specific gaseous components, such as carbon dioxide, cannot be separated hot by any of the methods cited above utilizing currently available technologies.

SUMMARY OF THE INVENTION

The feasibility of the conversion of such $C_1$ compounds as carbon dioxide, carbon monoxide, and methane into methanol, acetic acid, ethylene glycol, and organic compounds having a larger numbers of carbon atoms and higher economic value is being studied. The conversions mentioned above are often conducted by catalytic reactions requiring thermal energy. The separation of carbon dioxide from a hot waste gas while maintaining the high temperature can be expected to be advantageous from the viewpoint of the energy conservation because the thermal energy retained by the recovered carbon dioxide can be used per se as for the conversion reaction.

The present inventors, after conducting various studies, found that the hot separation of carbon dioxide from hot combustion waste gas can be achieved by causing the hot waste gas to be adsorbed on a specific solid adsorbent and separating the component, specifically carbon dioxide, contained in the adsorbed waste gas with an adsorbent. This invention has been perfected as a result.

This invention is specifically directed to a method for selective separation of carbon dioxide from hot combustion waste gas by causing the hot waste gas to contact an adsorbent containing as a substantial main component thereof an inorganic solid substance exhibiting surface basicity, thereby inducing adsorption of the components in the waste gas on the adsorbent, and then selectively separating the adsorbed components by virtue of the differences in retention time of the adsorbent among the components of the adsorbed waste gas.

DESCRIPTION OF THE PREFERRED EMBODIMENTS

Figure 1:
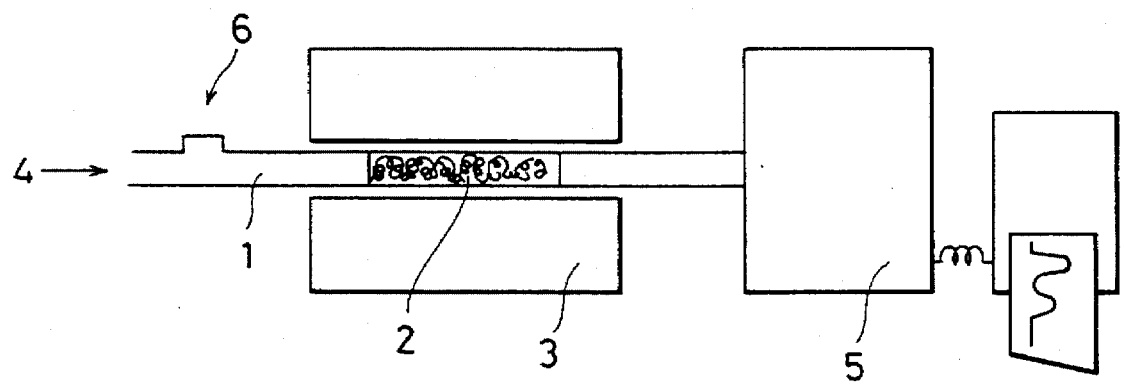
FIG. 1 is a schematic diagram of an apparatus used for working this invention.

The method of this invention enables separation from hot waste gas of combustion of such a gaseous component as, for example, carbon dioxide in its initial hot state by passing the hot waste gas over a bed of a powder or minute particles of an inorganic solid substance exhibiting surface basicity packed in a slender cylindrical thermally resistant container and kept at an elevated temperature.

The inorganic solid substance exhibiting surface basicity is preferably dolomite or europium oxide.

The method of this invention will now be described more specifically. When the hot combustion waste gas is passed over the inorganic solid substance, the specific components contained in the waste gas are adsorbed on the substance. These components are selectively separated and recovered by the differences in the lengths of time of adsorption and separation (differences in retention time).

The chemical formula of dolomite is $CaMg(CO_3)_2$. It has the form of a granular aggregate of white rhombohedral crystals of the trigonal system. It occurs copiously in sedimentary rocks and also arises from a hydrothermal action. Though it resembles calcite, it can be discriminated from calcite by the fact that it is not foamed by cold dilute hydrochloric acid, exhibits a high refractive index, shows the strongest line of X-ray diffraction at 2.886 Angstroms, and manifests two endothermic points near about 800° C. and 950° C. in the differential thermal analysis ("*Clay Handbook,*" Second Edition, p. 106, Nippon Clay Society, 1987).

Europium is one of the rare earth elements. Europium oxide is used, for example, as a red phosphor in color pictures tubes. The oxides of rare earth elements excel in resistance to heat and form well-known high-melting materials. The rare earth elements have chemical properties resembling those of alkali earth elements and the oxides thereof exhibit basicity ("*Rare Earths Physical Properties and Applications,*" p. 86, Tsuyoshi Kano and Hiroaki Yanagida, Gihodo, 1980). They can therefore be expected to exhibit high affinity for carbon dioxide, which is an acidic gas. Nothing has been known heretofore about the affinity of europium oxide for carbon dioxide or nitrogen at elevated temperatures.

In the method of this invention, the waste gas which generally has an elevated temperature at the time of occurrence is passed, as held in its initially hot state, over the inorganic solid substance. Preferably the temperature of the waste gas is in the range of 300° to 900° C. when the solid substance is dolomite and in the range of 100° to 1000° C. when the solid substance is europium oxide.

At temperatures falling short of 300° C. and at temperatures exceeding 900° C., dolomite is deficient in the ability to adsorb and separate carbon dioxide. At these temperatures, therefore, dolomite cannot be used as an adsorbent.

Though europium oxide is capable of adsorbing carbon dioxide over a wide temperature range from room temperature to 1000° C., the lower limit of the temperature of adsorption by europium oxide is set at 100° C. because the use of an organic separating agent suffices at temperatures falling below 100° C.

Generally, the hot combustion waste gas contains nitrogen gas in a large amount. This nitrogen gas is also amenable to the selective separation contemplated by this invention.

Typical examples of the hot combustion waste gases at which this invention is aimed include the waste gas from plants using fossil fuels and the exhaust gas from internal combustion engines. This invention does not particularly specify the hot waste gas by its origin and only requires that it contain at least carbon dioxide. Examples of hot waste gases to which this invention can be applied include, combustion gases, various reaction gases, and by-produced gases originating in electric furnaces, converters, gas producers, and coke ovens. They may be naturally existing or produced gases.

It is reported that the waste combustion gas from an oil-fired power plant has an average composition of 10% $CO_2$, 75% $N_2$, 3% $O_2$, and 12% $H_2O$ ("Atmosphere Enveloping the Earth," p. 109, Yuji Shindo, OtmK.K., 1993).

This invention separates a specific gaseous component such as carbon dioxide from hot combustion waste gas by a method which comprises causing the hot waste gas to contact dolomite as an adsorbent heated to a temperature in the range of 300° to 900° C., preferably exceeding 500° C., or to contact europium oxide, thereby inducing adsorption of the specific gaseous component on the adsorbent, and then separating the specific gas component from the adsorbent by utilizing the difference between lengths of time (retention time) required for the specific gaseous components to repeat adsorption to and separation from the dolomite or europium oxide. For the method of this invention, the dolomite or europium oxide is used, for example, as packed in the form of a bed of a powder or minute particles in a slender cylindrical thermally resistant container provided at the opposite ends thereof with an inlet and an outlet for a gaseous substance. The manner of use and the method of use of the adsorbent is not critical.

The inventors have found that the hot separation of carbon dioxide and nitrogen gas, for example, from hot waste gas, as demonstrated in the working examples cited hereinbelow, occurs in a temperature range of 300° to 900° C. in the case of dolomite and 100° to 1000° C. in the case of europium oxide because the retention time is longer for carbon dioxide and shorter for nitrogen gas and that these different retention times can be utilized for the separation. At the step of adsorption mentioned above, the retention times of the gaseous components in the waste gas are more or less varied by the flow volume of the waste gas. The retention times generally tend to decrease in proportion as the flow volume increases. By regulating the flow volume of the waste gas, therefore, the retention times of the specific gaseous components can be adjusted.

The specific gaseous components adsorbed to and separated from the adsorbent mentioned above are separated from one another by utilizing the differences in retention time among the gaseous components. By presetting such conditions as temperature, flow volume, and flow rate suitably for the specific gaseous components, the separation of the specific gaseous components can be facilitated.

The size and shape of the apparatus for separation, the material of the thermally resistant container, the shape of a temperature retaining device, etc. can be selected to suit the individual sources of waste gas such as, for example, a large stationary source like a steam power plant or an iron mill or a small disperse source like an automobile or a home. Naturally, the method of this invention for separation and recovery can be implemented without reference to the form of the origin mentioned above.

As described in detail above, this invention resides in a method for separating and recovering a specific gaseous component from a hot combustion waste gas, characterized by the steps of passing the waste gas at its original temperature or as adjusted to a prescribed temperature through an adsorbent containing an inorganic solid substance exhibiting surface basicity, thereby inducing adsorption of the specific gaseous component on the inorganic solid substance exhibiting surface basicity, and then selectively separating and recovering the specific gaseous components by virtue of differences in time for adsorption and separation of the specific gaseous component and other gaseous components (retention times) relative to the inorganic solid substance exhibiting surface basicity. According to this invention, a specific gaseous component such as carbon dioxide contained in a combustion gas discharged as a hot waste gas can be separated and recovered as kept at the initial elevated temperature.

[EXAMPLES]

This invention will now be described specifically with reference to working examples thereof.

The apparatus used in the working examples is shown in FIG. 1. In the diagram, 1 designates a quartz glass tube 10 mm in diameter, 2 for an adsorbent formed of an inorganic solid substance exhibiting surface basicity and packed in the glass tube, 3 for a tubular furnace for heating, 4 for a carrier gas, and 5 for a gas sensor (TCD).

First, the quartz glass tube 1 was packed with the adsorbent 2 and heated in the tubular furnace 4 to a prescribed temperature (heating temperature). Then, the packed quartz glass tube 1 was further heated to a prescribed temperature (the actual separating temperature equivalent to the temperature of the hot waste gas) and used for the following test.

A carrier gas 4 such as helium was continuously introduced at a fixed flow volume into the quartz glass tube 1 through one end thereof and a mixed gas 6 consisting of carbon dioxide and nitrogen was introduced therein in a fixed amount. The times which carbon dioxide and nitrogen spent in passing over the adsorbent while repeating adsorption to and separation from the adsorbent (retention times) were determined by the gas sensor 5. The time at which the mixed gas was introduced into the quartz glass tube 1 was reckoned as 0 second (in the length of the retention time).

Example 1

Figure 2:
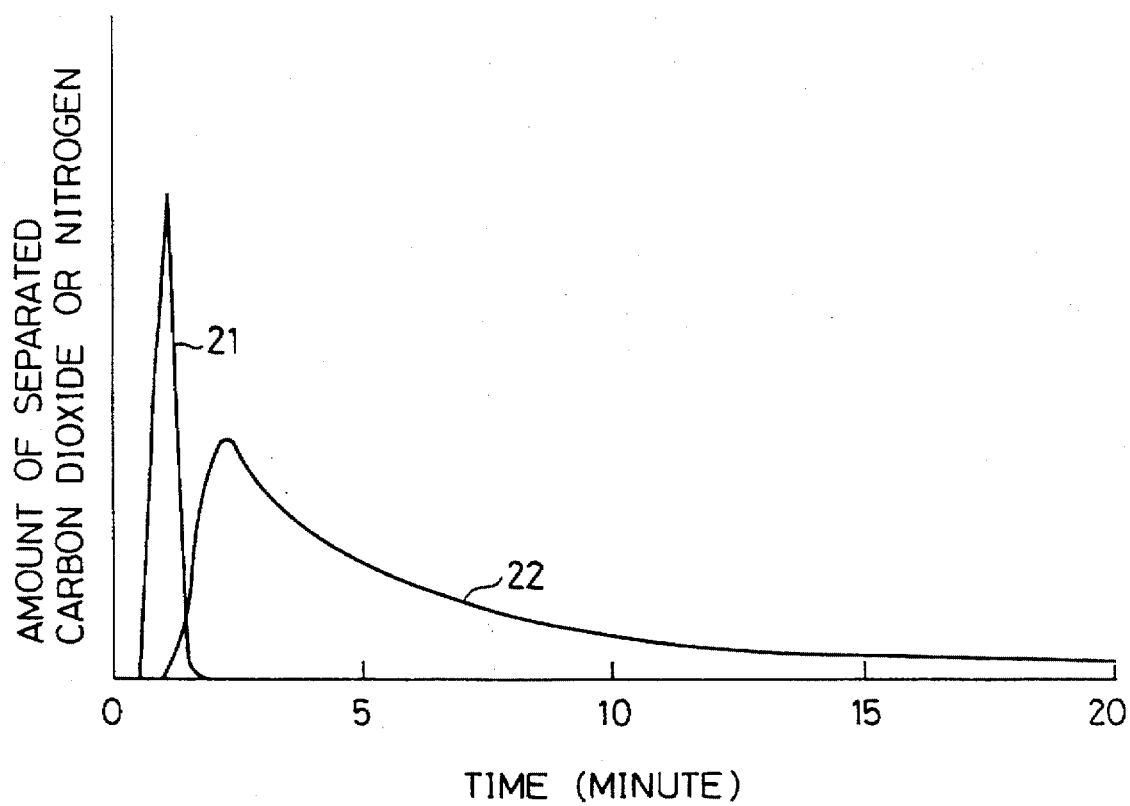
FIG. 2 is a diagram showing the results of a test for determining the retention times of nitrogen and carbon dioxide performed in Example 1.

The quartz glass tube 1 was packed with 1.00 g of dolomite as an adsorbent and heated to 800° C. (heating temperature). Then, as a mixed gas specimen at a temperature (separating temperature) of 600° C., helium as a carrier gas was continuously fed at a flow volume of 30 ml/min and a mixed gas consisting of 0.1 ml of carbon dioxide and 0.1 ml of nitrogen was introduced into the packed quartz glass tube 1. The chart consequently obtained by the gas sensor 5 is shown in FIG. 2. In the diagram of FIG. 2, the horizontal axis represents time (minutes) and the vertical axis represents the amount of separated carbon dioxide or nitrogen gas detected by the gas sensor after passage over the dolomite (the numerical value of the amount of carbon dioxide is indicated as multiplied by 8). The curves 21, 22 respectively denote the determined nitrogen gas and carbon dioxide retention times. FIG. 2 shows that the separation of carbon dioxide required a long time and that of nitrogen gas was completed in a short time.

Examples 2 to 22

The quartz glass tube was packed with 1.00 g of dolomite and, with helium as a carrier gas continuously fed at a flow volume of 30 ml/min thereto, maintained at a given temperature for two hours. After this heating, the specimen temperature (separating temperature) was set at a given level and carbon dioxide and nitrogen gas were introduced. The amount of carbon dioxide introduced was varied in the range of 0.1 to 5.0 ml and that of nitrogen gas fixed at 0.1 ml. The retention times of carbon dioxide and nitrogen gas were determined from the chromatograph consequently obtained. The differences found between the varying sets of retention times indicate that at all the separation temperatures in the range of 300° to 900° C., carbon dioxide was separated at higher temperatures than nitrogen gas. The results are shown in Table 1. Though no data obtained at temperatures below 300° C. are shown, the separation was naturally obtainable. It can be seen from the results that the ease with which carbon dioxide and nitrogen gas were separated increased in proportion as the difference between their retention times increased and that carbon dioxide and nitrogen gas were separated satisfactorily particularly at eluting temperatures in the range of 300° to 900° C.

required a long time and that of nitrogen gas was completed in a short time.

Examples 25 TO 32

Experiments were carried out by following the procedure of Example 23 while varying the specimen temperature (separation temperature). The results are shown in Table 2.

TABLE 2

| Example No. | Separating temperature (°C.) | Retention time (seconds) | | |
|---|---|---|---|---|
| | | Carbon dioxide | Nitrogen gas | Difference |
| 25 | 100 | * | 61 | — |
| 26 | 400 | * | 63 | — |
| 27 | 500 | 212 | 69 | 143 |
| 28 | 600 | 146 | 72 | 74 |
| 29 | 700 | 177 | 71 | 106 |
| 30 | 800 | 290 | 68 | 222 |
| 31 | 900 | 297 | 61 | 236 |
| 32 | 1000 | 150 | 63 | 87 |

*No elution observed

TABLE 1

| Example No. | Heating temperature (°C.) | Separating temperature (°C.) | Amount of carbon dioxide introduced (ml) | Retention time (second) | | |
|---|---|---|---|---|---|---|
| | | | | Carbon dioxide | Nitrogen gas | Difference |
| 2 | 300 | 300 | 0.1 | 75 | 68 | 7 |
| 3 | 500 | 300 | 0.1 | 71 | 65 | 6 |
| 4 | | 400 | 0.1 | 70 | 61 | 9 |
| 5 | | 500 | 0.1 | 71 | 59 | 12 |
| 6 | 600 | 300 | 0.1 | 8 | 69 | 20 |
| 7 | | 400 | 0.1 | 77 | 65 | 12 |
| 8 | | 500 | 0.1 | 106 | 62 | 44 |
| 9 | | 600 | 0.1 | 79 | 58 | 21 |
| 10 | 700 | 700 | 0.1 | 92 | 72 | 20 |
| 11 | 800 | 600 | 0.1 | 128 | 57 | 71 |
| 12 | | 700 | 0.1 | 100 | 56 | 44 |
| 13 | | 800 | 0.1 | 81 | 54 | 27 |
| 14 | 900 | 300 | 1.0 | 98 | 62 | 36 |
| 15 | | | 5.0 | 77 | 62 | 15 |
| 16 | | 600 | 1.0 | 140 | 63 | 77 |
| 17 | | 700 | 0.1 | 195 | 58 | 137 |
| 18 | | | 1.0 | 93 | 65 | 28 |
| 19 | | 800 | 0.1 | 95 | 49 | 33 |
| 21 | | | 5.0 | 61 | 49 | 12 |
| 22 | | 900 | 0.1 | 73 | 50 | 23 |

Example 23

The quartz glass tube was packed with 5.0 g of europium oxide and, with the specimen temperature (separating temperature) set at 900° C., helium as a carrier gas was continuously fed at a flow volume of 30 ml/min and a mixed gas consisting of 0.1 ml of carbon dioxide and 0.1 ml of nitrogen gas was introduced.

Figure 3:
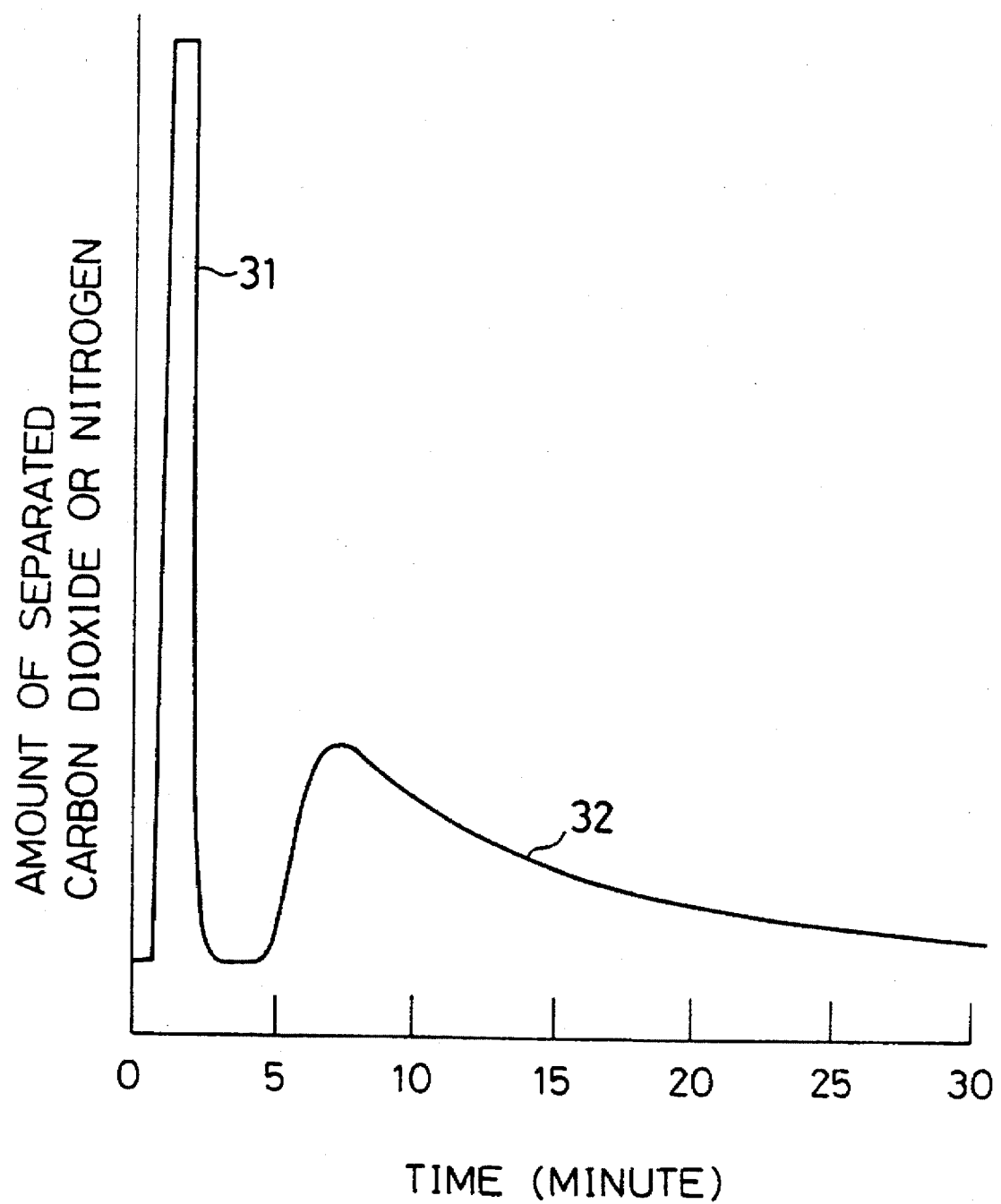
FIG. 3 is a diagram showing the results of a test for determining the retention times of nitrogen and carbon dioxide performed in Example 23.

The determined retention times are shown in FIG. 3. In the diagram, curves 31, 32 respectively denote the determined nitrogen gas and carbon dioxide retention times.

Example 24

Figure 4:
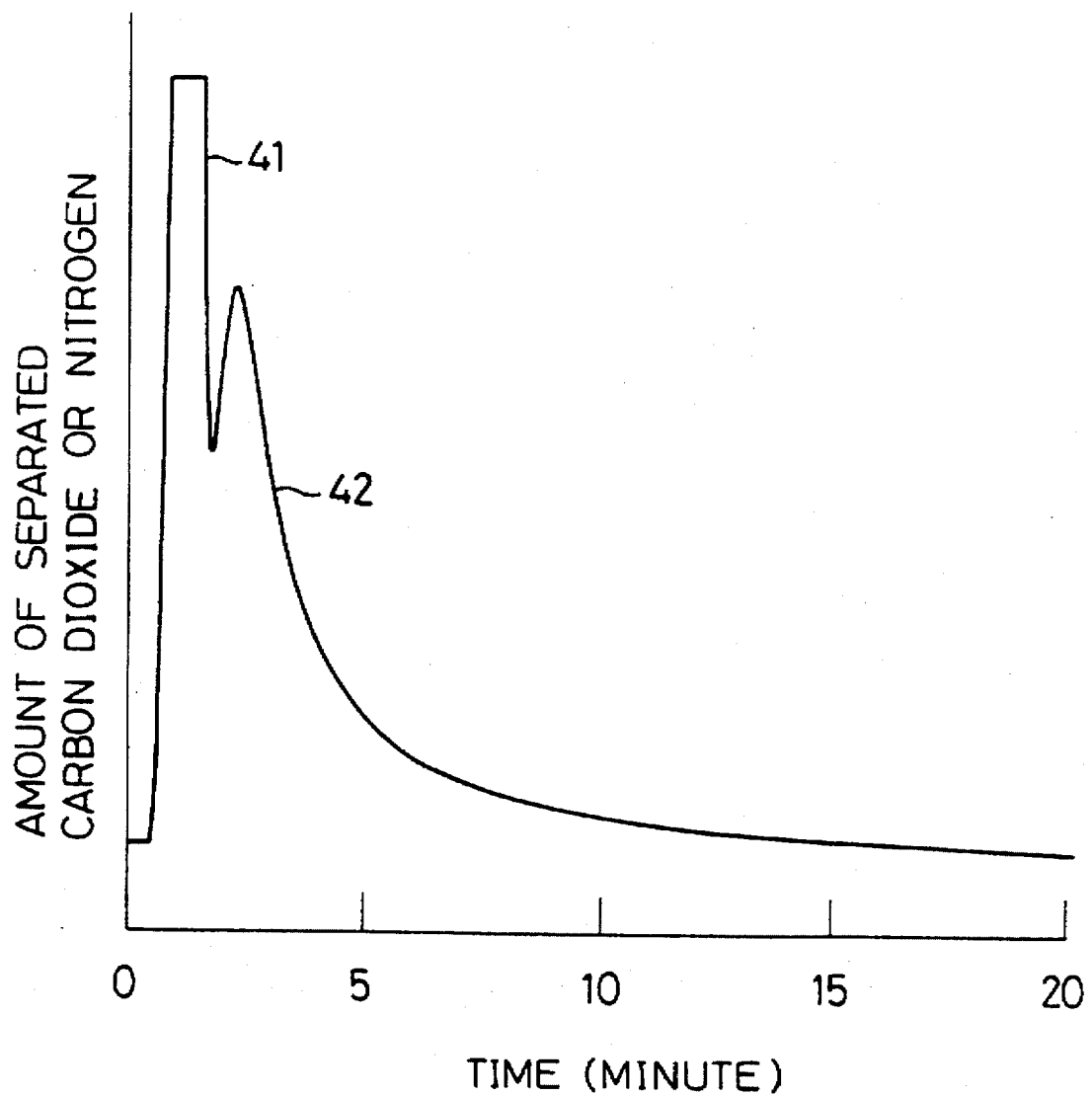
FIG. 4 is a diagram showing the results of a test for determining the retention times of nitrogen and carbon dioxide performed in Example 24.

An experiment was performed by following the procedure of Example 23 while changing the specimen temperature (separation temperature) to 1000° C. The results are shown in FIG. 4, in which curves 41, 42 respectively denote the determined nitrogen gas and carbon dioxide retention times. FIGS. 3 and 4 show that the separation of carbon dioxide Example 33

Figure 5:
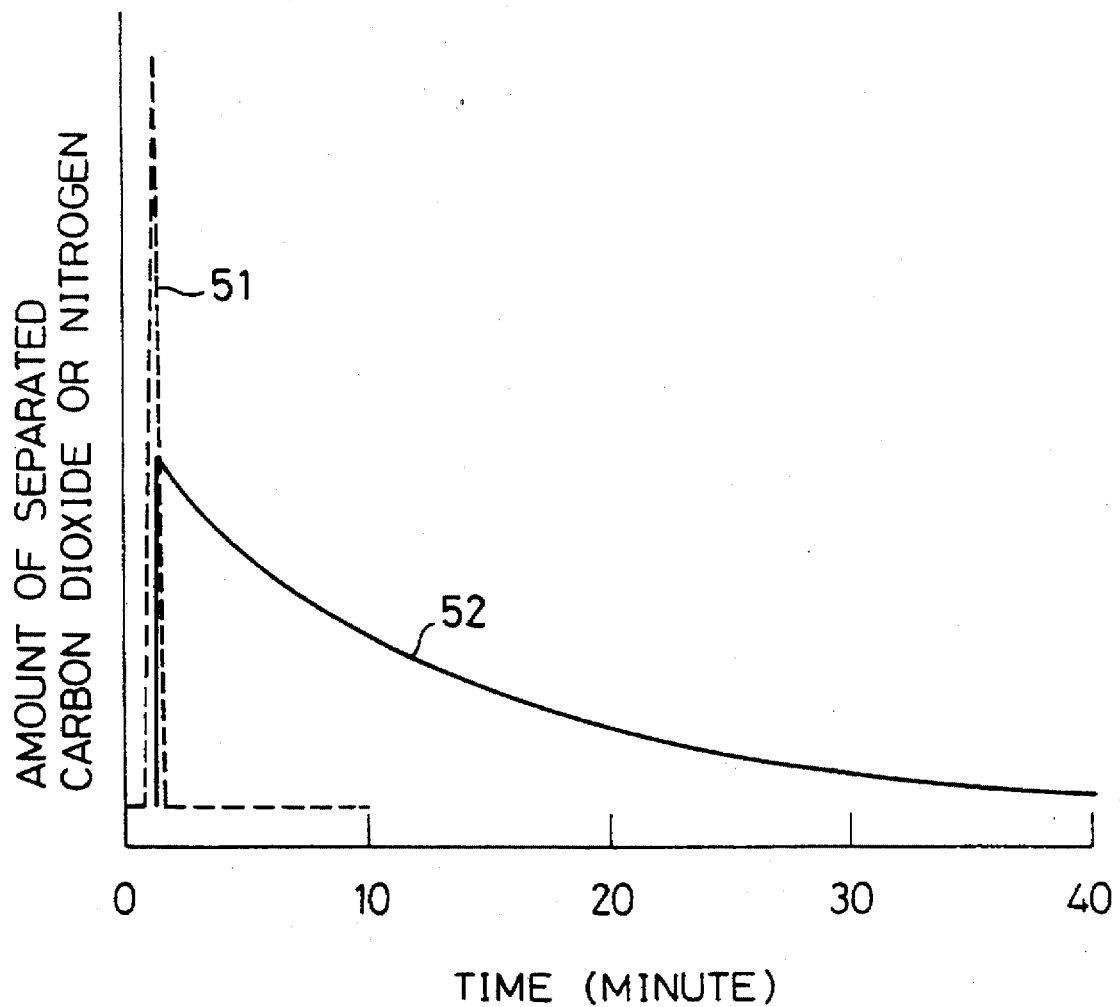
FIG. 5 is a diagram showing the results of a test for determining the retention times of nitrogen and carbon dioxide performed in Example 33.

An experiment was carried out by following the procedure of Example 23 while fixing the specimen temperature (separating temperature) at 300° C. The amount of nitrogen gas introduced was 0.1 ml, and that of carbon dioxide was 5.0 ml. The results are shown in FIG. 5, in which curves 51, 52 respectively denote the determined nitrogen gas and carbon dioxide retention times. The results show that the separation of nitrogen was completed in a very short time (about 60 seconds), while the separation of carbon dioxide continued for about 40 minutes.

As shown in Examples 25 to 32, hot separation of carbon dioxide was obtained over a wide range of separating temperatures.

The ease with which the separation of carbon dioxide and nitrogen gas is obtained increases in proportion as the difference in retention time between the two compounds increases. It is particularly noteworthy that the separation of carbon dioxide and nitrogen gas is satisfactorily obtained at such high temperatures as 700°, 800°, 900°, and 1000° C.

What is claimed is:

1. A method for the separation and recovery of gaseous components inclusive of carbon dioxide from a hot waste gas of combustion comprising the steps of:

contacting said hot waste gas to an adsorbent comprising europium oxide;

adsorbing said gaseous components onto said adsorbent; and selectively separating and recovering adsorbed gaseous components by virtue of differences in retention times among said gaseous components on said adsorbent;

wherein the temperature of said hot waste gas is in the range of 1001° to 1000° C.

2. The method according to claim 1, wherein said hot waste gas contains nitrogen gas.

* * * * *